(12) United States Patent
Eicholz et al.

(10) Patent No.: US 8,675,860 B2
(45) Date of Patent: Mar. 18, 2014

(54) TRAINING OPTIMIZER FOR CONTACT CENTER AGENTS

(75) Inventors: Alan David Eicholz, Sammimish, WA (US); Andrew D. Flockhart, Thornton, CO (US); Tore Christensen, Boulder, CO (US); Katherine Anthony Sobus, Wilmington, DE (US)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 13/398,474

(22) Filed: Feb. 16, 2012

(65) Prior Publication Data

US 2013/0216037 A1 Aug. 22, 2013

(51) Int. Cl.
*H04M 3/00* (2006.01)
*H04M 5/00* (2006.01)

(52) U.S. Cl.
USPC ............ 379/265.13; 379/265.01; 379/265.02; 379/265.05; 379/266.02

(58) Field of Classification Search
USPC ............ 379/265.01, 265.02, 265.05, 265.06, 379/265.12, 265.13, 266.01, 265.03, 379/265.04, 265.07, 265.08, 265.09, 265.1, 379/265.11, 265.14, 266.02, 266.03, 379/266.04, 266.05, 266.06, 266.07, 379/266.08, 266.09, 266.1
See application file for complete search history.

(56) References Cited

U.S. PATENT DOCUMENTS

| 4,163,124 A | 7/1979 | Jolissaint |
|---|---|---|
| 4,567,323 A | 1/1986 | Lottes et al. |
| 4,737,983 A | 4/1988 | Frauenthal et al. |
| 4,797,911 A | 1/1989 | Szlam et al. |
| 4,894,857 A | 1/1990 | Szlam et al. |
| 5,001,710 A | 3/1991 | Gawrys et al. |
| 5,097,528 A | 3/1992 | Gursahaney et al. |
| 5,101,425 A | 3/1992 | Darland et al. |
| 5,155,761 A | 10/1992 | Hammond |
| 5,164,983 A | 11/1992 | Brown et al. |
| 5,206,903 A | 4/1993 | Kohler et al. |
| 5,210,789 A | 5/1993 | Jeffus et al. |
| 5,274,700 A | 12/1993 | Gechter et al. |
| 5,278,898 A | 1/1994 | Cambray et al. |
| 5,291,550 A | 3/1994 | Levy et al. |
| 5,299,260 A | 3/1994 | Shaio |
| 5,309,513 A | 5/1994 | Rose |
| 5,335,268 A | 8/1994 | Kelly, Jr. et al. |

(Continued)

FOREIGN PATENT DOCUMENTS

| AU | 2011200790 A1 | 3/2011 |
|---|---|---|
| CA | 2143198 | 1/1995 |

(Continued)

OTHER PUBLICATIONS

U.S. Appl. No. 10/815,566, filed Mar. 31, 2004, Kiefhaber et al.

(Continued)

*Primary Examiner* — Khai N Nguyen
(74) *Attorney, Agent, or Firm* — Sheridan Ross P.C.

(57) ABSTRACT

The present disclosure describes various ways of monitoring the needs of a contact center in real-time and pushing training to a number of agents to address those needs. In determining to push training to agents, the short-term efficiency of the agent is balanced with the long-term efficiency of the contact center. When agents receive and then complete training events designed to address the monitored contact center needs the attributes associated with the agents are updated to allow them to handle the contacts requiring training.

20 Claims, 4 Drawing Sheets

(56) References Cited

U.S. PATENT DOCUMENTS

| | | |
|---|---|---|
| 5,335,269 A | 8/1994 | Steinlicht |
| 5,390,243 A | 2/1995 | Casselman et al. |
| 5,436,965 A | 7/1995 | Grossman et al. |
| 5,444,774 A | 8/1995 | Friedes |
| 5,469,503 A | 11/1995 | Butensky et al. |
| 5,469,504 A | 11/1995 | Blaha |
| 5,473,773 A | 12/1995 | Aman et al. |
| 5,479,497 A | 12/1995 | Kovarik |
| 5,500,795 A | 3/1996 | Powers et al. |
| 5,504,894 A | 4/1996 | Ferguson et al. |
| 5,506,898 A | 4/1996 | Costantini et al. |
| 5,530,744 A | 6/1996 | Charalambous et al. |
| 5,537,470 A | 7/1996 | Lee |
| 5,537,542 A | 7/1996 | Eilert et al. |
| 5,544,232 A | 8/1996 | Baker et al. |
| 5,546,452 A | 8/1996 | Andrews et al. |
| 5,592,378 A | 1/1997 | Cameron et al. |
| 5,592,542 A | 1/1997 | Honda et al. |
| 5,594,726 A | 1/1997 | Thompson et al. |
| 5,606,361 A | 2/1997 | Davidsohn et al. |
| 5,611,076 A | 3/1997 | Durflinger et al. |
| 5,627,884 A | 5/1997 | Williams et al. |
| 5,642,515 A | 6/1997 | Jones et al. |
| 5,684,872 A | 11/1997 | Flockhart et al. |
| 5,684,874 A | 11/1997 | Yagyu et al. |
| 5,684,964 A | 11/1997 | Powers et al. |
| 5,689,698 A | 11/1997 | Jones et al. |
| 5,703,943 A | 12/1997 | Otto |
| 5,713,014 A | 1/1998 | Durflinger et al. |
| 5,721,770 A | 2/1998 | Kohler |
| 5,724,092 A | 3/1998 | Davidsohn et al. |
| 5,740,238 A | 4/1998 | Flockhart et al. |
| 5,742,675 A | 4/1998 | Kilander et al. |
| 5,748,468 A | 5/1998 | Notenboom et al. |
| 5,749,079 A | 5/1998 | Yong et al. |
| 5,751,707 A | 5/1998 | Voit et al. |
| 5,752,027 A | 5/1998 | Familiar |
| 5,754,639 A | 5/1998 | Flockhart et al. |
| 5,754,776 A | 5/1998 | Hales et al. |
| 5,754,841 A | 5/1998 | Carino, Jr. |
| 5,757,904 A | 5/1998 | Anderson |
| 5,790,677 A | 8/1998 | Fox et al. |
| 5,790,798 A | 8/1998 | Beckett, II et al. |
| 5,794,250 A | 8/1998 | Carino, Jr. et al. |
| 5,796,393 A | 8/1998 | MacNaughton et al. |
| 5,802,282 A | 9/1998 | Hales et al. |
| 5,818,907 A | 10/1998 | Maloney et al. |
| 5,825,869 A | 10/1998 | Brooks et al. |
| 5,828,747 A | 10/1998 | Fisher et al. |
| 5,838,968 A | 11/1998 | Culbert |
| 5,839,117 A | 11/1998 | Cameron et al. |
| 5,875,437 A | 2/1999 | Atkins |
| 5,880,720 A | 3/1999 | Iwafune et al. |
| 5,881,238 A | 3/1999 | Aman et al. |
| 5,884,032 A | 3/1999 | Bateman et al. |
| 5,889,956 A | 3/1999 | Hauser et al. |
| 5,897,622 A | 4/1999 | Blinn et al. |
| 5,903,641 A | 5/1999 | Tonisson |
| 5,903,877 A | 5/1999 | Berkowitz et al. |
| 5,905,793 A | 5/1999 | Flockhart et al. |
| 5,915,012 A | 6/1999 | Miloslavsky |
| 5,926,538 A | 7/1999 | Deryugin et al. |
| 5,930,786 A | 7/1999 | Carino, Jr. et al. |
| 5,937,051 A | 8/1999 | Hurd et al. |
| 5,937,402 A | 8/1999 | Pandilt |
| 5,940,496 A | 8/1999 | Gisby et al. |
| 5,943,416 A | 8/1999 | Gisby |
| 5,948,065 A | 9/1999 | Eilert et al. |
| 5,960,073 A | 9/1999 | Kikinis et al. |
| 5,963,635 A | 10/1999 | Szlam et al. |
| 5,963,911 A | 10/1999 | Walker et al. |
| 5,970,132 A | 10/1999 | Brady |
| 5,974,135 A | 10/1999 | Breneman et al. |
| 5,974,462 A | 10/1999 | Aman et al. |
| 5,982,873 A | 11/1999 | Flockhart et al. |
| 5,987,117 A | 11/1999 | McNeil et al. |
| 5,991,392 A | 11/1999 | Miloslavsky |
| 5,996,013 A | 11/1999 | Delp et al. |
| 5,999,963 A | 12/1999 | Bruno et al. |
| 6,000,832 A | 12/1999 | Franklin et al. |
| 6,011,844 A | 1/2000 | Uppaluru et al. |
| 6,038,293 A | 3/2000 | Mcnemey et al. |
| 6,044,144 A | 3/2000 | Becker et al. |
| 6,044,205 A | 3/2000 | Reed et al. |
| 6,044,355 A | 3/2000 | Crockett et al. |
| 6,049,547 A | 4/2000 | Fisher et al. |
| 6,052,723 A | 4/2000 | Ginn |
| 6,055,308 A | 4/2000 | Miloslavsky et al. |
| 6,064,730 A | 5/2000 | Ginsberg |
| 6,064,731 A | 5/2000 | Flockhart et al. |
| 6,084,954 A | 7/2000 | Harless et al. |
| 6,088,441 A | 7/2000 | Flockhart et al. |
| 6,115,462 A | 9/2000 | Servi et al. |
| 6,128,380 A | 10/2000 | Shaffer et al. |
| 6,151,571 A | 11/2000 | Pertrushin |
| 6,154,769 A | 11/2000 | Cherkasova et al. |
| 6,163,607 A | 12/2000 | Bogart et al. |
| 6,173,053 B1 | 1/2001 | Bogart et al. |
| 6,175,564 B1 | 1/2001 | Miloslavsky et al. |
| 6,178,441 B1 | 1/2001 | Elnozahy |
| 6,185,292 B1 | 2/2001 | Miloslavsky |
| 6,192,122 B1 | 2/2001 | Flockhart et al. |
| 6,215,865 B1 | 4/2001 | McCalmont |
| 6,226,377 B1 | 5/2001 | Donaghue, Jr. |
| 6,229,819 B1 | 5/2001 | Darland et al. |
| 6,230,183 B1 | 5/2001 | Yocom et al. |
| 6,233,333 B1 | 5/2001 | Dezonmo |
| 6,240,471 B1 | 5/2001 | Schlueter et al. |
| 6,259,969 B1 | 7/2001 | Tackett et al. |
| 6,263,359 B1 | 7/2001 | Fong et al. |
| 6,272,544 B1 | 8/2001 | Mullen |
| 6,275,806 B1 | 8/2001 | Pertrushin |
| 6,275,812 B1 | 8/2001 | Haq et al. |
| 6,275,991 B1 | 8/2001 | Erlin |
| 6,278,777 B1 | 8/2001 | Morley |
| 6,292,550 B1 | 9/2001 | Burritt |
| 6,295,353 B1 | 9/2001 | Flockhart et al. |
| 6,301,573 B1 | 10/2001 | McIllwaine et al. |
| 6,324,282 B1 | 11/2001 | McIllwaine et al. |
| 6,353,810 B1 | 3/2002 | Petrushin |
| 6,356,632 B1 | 3/2002 | Foster et al. |
| 6,366,668 B1 | 4/2002 | Borst et al. |
| 6,389,028 B1 | 5/2002 | Bondarenko et al. |
| 6,389,132 B1 | 5/2002 | Price |
| 6,389,400 B1 | 5/2002 | Bushey et al. |
| 6,424,709 B1 | 7/2002 | Doyle et al. |
| 6,426,950 B1 | 7/2002 | Mistry |
| 6,427,137 B2 | 7/2002 | Petrushin |
| 6,430,282 B1 | 8/2002 | Bannister et al. |
| 6,434,230 B1 | 8/2002 | Gabriel |
| 6,449,356 B1 | 9/2002 | Dezonno |
| 6,449,358 B1 | 9/2002 | Anisimov et al. |
| 6,449,646 B1 | 9/2002 | Sikora et al. |
| 6,453,038 B1 | 9/2002 | McFarlane et al. |
| 6,459,787 B2 | 10/2002 | McIllwaine et al. |
| 6,463,148 B1 | 10/2002 | Brady |
| 6,463,346 B1 | 10/2002 | Flockhart et al. |
| 6,463,415 B2 | 10/2002 | St. John |
| 6,480,826 B2 | 11/2002 | Pertrushin |
| 6,490,350 B2 | 12/2002 | McDuff et al. |
| 6,535,600 B1 | 3/2003 | Fisher et al. |
| 6,535,601 B1 | 3/2003 | Flockhart et al. |
| 6,560,330 B2 | 5/2003 | Gabriel |
| 6,560,649 B1 | 5/2003 | Mullen et al. |
| 6,560,707 B2 | 5/2003 | Curtis et al. |
| 6,563,920 B1 | 5/2003 | Flockhart et al. |
| 6,597,685 B2 | 7/2003 | Miloslavsky et al. |
| 6,614,903 B1 | 9/2003 | Flockhart et al. |
| 6,628,777 B1 | 9/2003 | McIllwaine et al. |
| 6,639,982 B1 * | 10/2003 | Stuart et al. ............ 379/266.03 |
| 6,650,748 B1 | 11/2003 | Edwards et al. |
| 6,697,457 B2 | 2/2004 | Petrushin |
| 6,704,409 B1 | 3/2004 | Dilip et al. |
| 6,707,903 B2 | 3/2004 | Burok et al. |

(56) References Cited

U.S. PATENT DOCUMENTS

| | | |
|---|---|---|
| 6,744,877 B1 | 6/2004 | Edwards |
| 6,754,333 B1 | 6/2004 | Flockhart et al. |
| 6,766,013 B2 | 7/2004 | Flockhart et al. |
| 6,766,014 B2 | 7/2004 | Flockhart et al. |
| 6,775,377 B2 | 8/2004 | McIllwaine et al. |
| 6,947,543 B2 | 9/2005 | Alvarado et al. |
| 7,035,808 B1 | 4/2006 | Ford |
| 7,035,927 B2 | 4/2006 | Flockhart et al. |
| 7,050,567 B1* | 5/2006 | Jensen ............. 379/266.01 |
| 7,200,219 B1 | 4/2007 | Edwards et al. |
| 7,295,669 B1 | 11/2007 | Denton et al. |
| 7,336,779 B2 | 2/2008 | Boyer et al. |
| 7,500,241 B1 | 3/2009 | Flockhart et al. |
| 7,711,104 B1 | 5/2010 | Flockhart et al. |
| 7,734,032 B1 | 6/2010 | Kiefhaber et al. |
| 7,770,175 B2 | 8/2010 | Flockhart et al. |
| 7,916,858 B1* | 3/2011 | Heller et al. ............. 379/265.12 |
| 7,953,859 B1 | 5/2011 | Kiefhaber et al. |
| 8,000,989 B1 | 8/2011 | Kiefhaber et al. |
| 2001/0056349 A1 | 12/2001 | St. John |
| 2002/0002460 A1 | 1/2002 | Pertrushin |
| 2002/0002464 A1 | 1/2002 | Petrushin |
| 2002/0009190 A1 | 1/2002 | McIllwaine et al. |
| 2002/0010587 A1 | 1/2002 | Pertrushin |
| 2002/0118816 A1 | 8/2002 | Flockhart et al. |
| 2002/0143599 A1* | 10/2002 | Nourbakhsh et al. ............. 705/9 |
| 2002/0181692 A1 | 12/2002 | Flockhart et al. |
| 2002/0194002 A1 | 12/2002 | Petrushin |
| 2003/0008655 A1 | 1/2003 | Kanemoto et al. |
| 2003/0048893 A1 | 3/2003 | McIllwaine et al. |
| 2003/0059029 A1* | 3/2003 | Mengshoel et al. ..... 379/265.02 |
| 2003/0086555 A1 | 5/2003 | McIllwaine et al. |
| 2003/0093465 A1 | 5/2003 | Banerjee et al. |
| 2003/0123642 A1 | 7/2003 | Alvarado et al. |
| 2003/0152212 A1 | 8/2003 | Burok et al. |
| 2003/0174830 A1 | 9/2003 | Boyer et al. |
| 2003/0177017 A1 | 9/2003 | Boyer et al. |
| 2003/0177231 A1 | 9/2003 | Flockhart et al. |
| 2004/0083195 A1 | 4/2004 | McCord et al. |
| 2004/0165717 A1 | 8/2004 | McIlwaine et al. |
| 2004/0202308 A1 | 10/2004 | Baggenstoss et al. |
| 2004/0202309 A1 | 10/2004 | Baggenstoss et al. |
| 2004/0203878 A1 | 10/2004 | Thomson |
| 2005/0071211 A1 | 3/2005 | Flockhart et al. |
| 2005/0071212 A1 | 3/2005 | Flockhart et al. |
| 2005/0071241 A1 | 3/2005 | Flockhart et al. |
| 2005/0175971 A1 | 8/2005 | McIlwaine et al. |
| 2005/0209868 A1* | 9/2005 | Wan et al. ............. 705/1 |
| 2006/0015388 A1 | 1/2006 | Flockhart et al. |
| 2006/0115074 A1* | 6/2006 | Hollatz et al. ............. 379/265.09 |
| 2006/0182259 A1 | 8/2006 | Shaffer et al. |
| 2006/0233346 A1 | 10/2006 | McIlwaine et al. |
| 2006/0256953 A1 | 11/2006 | Pulaski et al. |
| 2006/0256954 A1* | 11/2006 | Patel et al. ............. 379/265.12 |
| 2007/0071222 A1* | 3/2007 | Flockhart et al. ........ 379/265.02 |
| 2009/0089138 A1 | 4/2009 | Minert et al. |
| 2010/0235218 A1 | 9/2010 | Erhart et al. |
| 2010/0296417 A1 | 11/2010 | Steiner |
| 2010/0303225 A1 | 12/2010 | Shashkov et al. |
| 2011/0125793 A1 | 5/2011 | Erhart et al. |
| 2011/0125826 A1 | 5/2011 | Erhart et al. |
| 2011/0255683 A1 | 10/2011 | Flockhart et al. |

FOREIGN PATENT DOCUMENTS

| | | |
|---|---|---|
| CA | 2174762 | 3/1996 |
| EP | 0501189 | 9/1992 |
| EP | 0740450 | 10/1996 |
| EP | 0772335 | 5/1997 |
| EP | 0855826 | 7/1998 |
| EP | 0829996 | 9/1998 |
| EP | 0863651 | 9/1998 |
| EP | 0866407 | 9/1998 |
| EP | 0899673 | 3/1999 |
| EP | 0982915 | 3/2000 |
| EP | 0998108 | 5/2000 |
| EP | 1091307 | 4/2001 |
| EP | 1150236 | 10/2001 |
| GB | 2273418 | 6/1994 |
| GB | 2290192 | 12/1995 |
| WO | WO 96/07141 | 3/1996 |
| WO | WO 97/28635 | 8/1997 |
| WO | WO 98/56207 | 12/1998 |
| WO | WO 2005/011240 | 2/2005 |

OTHER PUBLICATIONS

"The Advantages of Load Balancing in the Multi-Call Center Enterprise," Avaya Inc. White Paper (Feb. 2002), pp. 1-13.

Ahmed, "A Scalable Byzantine Fault Tolerant Secure Domain Name System," thesis submitted to Massachusetts Institute of Technology, Department of Electrical Engineering and Computer Science, Jan. 22, 2001, 101 pages.

Applications, NPRI's Predictive Dialing Package: Computer Technology (Fall 1993), p. 86.

Arslan et al., "Language Accent Classification in American English," Robust Speech Processing Laboratory, Duke University Department of Electrical Engineering, Durham, NC, Technical Report RSPL-96-7, revised Jan. 29, 1996, pp. 1-16.

Arslan, "Foreign Accent Classification in American English," Department of Electrical Computer Engineering, Duke University, Thesis, pp. 1-200 (1996).

Avaya, Inc. Business Advocate Options, at http://www.avaya.com. downloaded on Feb. 15, 2003, Avaya, Inc. 2003.

Avaya, Inc. Business Advocate Product Summary, at http://www.avaya.com. downloaded on Feb. 15, 2003, Avaya, Inc. 2003, 3 pages.

Avaya, Inc., "Better Implementation of IP in Large Networks," Avaya, Inc. 2002, 14 pages.

Avaya, Inc., "Voice Over IP Via Virtual Private Networks: An Overview," Avaya, Inc., Feb. 2001, 9 pages.

Bellsouth Corp., "Frequently Asked Questions—What is a registrar?," available at https://registration.bellsouth.netINASApp/DNSWebUI/Faq.jsp, downloaded Mar. 31, 2003, 4 pages.

Call Center Software You Can't Outgrow: Telemarketing® (Jul. 1993), p. 105.

CentreVu Advocate Release 9 User Guide, Avaya Inc., 585-215-953, Issue 1 (Dec. 2000), pp. 1-210.

Chavez, et al., "Avaya MultiVantage Software: Adapting Proven Call Processing for the Transition to Converged IP Networks," Avaya, Inc., Aug. 2002.

Coles, "A Guide for Ensuring Service Quality in IP Voice Networks," Avaya, Inc., 2002, pp. 1-17.

Dawson, "NPRI's Powerguide, Software Overview" Call Center Magazine (Jun. 1993), p. 85.

"Domain Name Services," Chapter 9 available at http://www.pism.com/chapt09/chapt09.html, downloaded Mar. 31, 2003, 21 pages.

"eGain's Commerce 2000 Platform Sets New Standard for eCommerce Customer Communications," Business Wire (Nov. 15, 1999)., 3 pages.

Foster et al., "Avaya Business Advocate and its Relationship to Multi-Site Load Balancing Applications," Avaya, Inc., Mar. 2002, 14 pages.

Hansen et al., "Foreign Accent Classification Using Source Generator Based Prosodic Features," IEEE Proc. ICASSP, vol. 1, pp. 836-839, Detroit USA (May 1995).

"Internet Protocol Addressing," available at http://samspade.org/dlipdns.html, downloaded Mar. 31, 2003, 4 pages.

Kim et al. "Collaborative Multimedia Middleware Architecture and Advanced Internet Call Center," Proceedings at the International Conference on Information NetworKing (Jan. 31, 2001), pp. 246-50.

Knowlagent r7, "Enable and Certify the Adoption of Change to Deliver Predictable Call Outcomes," available at http://216.86.37/solution r7.asp, Aug. 23, 2005, 1 page.

MIT Project Oxygen, Pervasive, Human-Centered Computing (MIT Laboratory for Computer Science) (Jun. 2000) pp. 1-15.

Noth et al., "Research Issues for the Next Generation Spoken," University of Erlangen-Nuremberg, Bavarian R, Feb. 10, 2003, 8 pages.

Presentation by Victor Zue, The MIT Oxygen Project, MIT Laboratory for Computer Science (Apr. 25-26, 2000) 9 pages.

(56) References Cited

OTHER PUBLICATIONS

Product Features: Guide to Call Center Automation, Brock Control Systems, Inc., Activity Managers Series™, Section 5—Company B120, p. 59, 1992.

Product Features: Guide to Call Center Automation, CRC Information Systems, Inc., Tel-Athena, Section 5—Company C520, p. 95, 1992.

Stevenson et al.; "Name Resolution in Network and Systems Management Environments"; http://netman.cit.buffalo.edu/Doc/DStevenson/NR-NMSE.html; printed Mar. 31, 2003; 16 pages.

VAST™, Voicelink Application Software for Teleservicing®: System Manager User's Guide, Digital Systems (1994), pp. ii, vii-ix, 1-2,2-41 through 2-77.

"When Talk Isn't Cheap," Sm@rt Reseller, v. 3, n. 13 (Apr. 3, 2000), p. 50.

* cited by examiner

| 404 | 408 | 412 | 416 | 420 | 424 | 428 | 432 |
|---|---|---|---|---|---|---|---|
| Work Type | Resource/Agent Rules | Service Goals | Actual Service Levels | Efficiency Threshold | Efficiency and Balancing Rules | Training Attribute Update | Management Allocation Rules |

| 504 | 508 | 512 | 516 | 520 |
|---|---|---|---|---|
| Agent Identifier | Skills/Attributes | Availability | Work Type Preference | Agent Performance |

TRAINING OPTIMIZER FOR CONTACT CENTER AGENTS

FIELD

The invention relates generally to contact centers and specifically the training of contact center agents.

BACKGROUND

Contact centers can provide numerous services to customers, and have been doing so for years. The idea of a contact center queue is not much different from that of standing in line at a bank and waiting to be helped by the next available teller. However, there can be a lot of frustration if the first, second, or even third teller cannot answer a given question or set of questions. The same frustrations have been known to occur in contact centers. A company can gain customer satisfaction if they are able to answer their customers' questions quickly and accurately.

Contact center technology, such as Automatic Call Distribution or ACD systems, are employed by many enterprises to service customer contacts. A typical contact center includes a switch and/or server to receive and route incoming packet-switched and/or circuit-switched contacts and one or more resources, such as human agents and automated resources (e.g., Interactive Voice Response (IVR) units), to service the incoming contacts.

As products and problems become more complex and diverse in nature, a single agent often no longer has all of the skills or expertise to fully service customer contacts. To service customer contacts more effectively, the contact center increases training and has incorporated the use of dedicated Subject Matter Experts or SMEs, who are highly trained agents in a given aspect of a business. For example, contact centers that handle computer customer service may have application SMEs, hardware SMEs, operating system SMEs, network SMEs, etc. While SMEs are well qualified to answer questions on their particular subject(s), they are often unqualified to answer questions involving subjects outside of their respective specialties.

It is an objective of a contact center to provide the best possible service to each individual customer while constantly evaluating and addressing the needs of all contacting customers. This service can best be achieved by offering high-quality assistance from a qualified agent coupled with a minimal queue wait time for a customer. In order to facilitate a higher level of service, more qualified agents may be trained in various specialties.

Unfortunately, training agents in a large number of specialties takes valuable time and resources away from the contact center workflow and may negatively affect the level of immediately available customer service. Specifically, there are many specialties and work types in a typical contact center and training a multitude of agents in all of these specialties at once would be a difficult and time consuming task. Moreover, workflow demands may require a high-volume of attention in a particular specialty or work type at a given time period and once the demand is quelled, it may not repeat for some time. It is also very difficult to predict when such demands will present themselves.

To implement training where deemed necessary, contact centers utilize a series of surveys and agent scoring to identify poor performance and training needs. In many cases, this training occurs too long after an "event" has transpired. As a result, training and performance issues are identified too late, if at all. In the meantime, the agent has continued, and reinforced, the uncorrected behavior.

Thus, it is a long-felt need in contact center architecture to train agents in various specialties to meet the demands of a dynamically changing real-world contact flow.

SUMMARY

These and other needs are addressed by the various embodiments and configurations of the present invention. The present disclosure recites a method where a training optimization mechanism is used to identify "under-trained" conditions in real-time and push training to agent desktops automatically during ready-time. Moreover, as agents complete their testing certification and/or training for a specific attribute the training optimization mechanism may automatically updates the agent's attribute set so the agent will be available to immediately begin addressing these deficient work types.

One embodiment of the present disclosure can determine if a particular type of work assignment is being handled by experts. For instance, the contact center may be observed for work assignments where a critical mass of SMEs is allocated. The training optimization mechanism may classify these work assignments as "high-priority" work. Furthermore, the training optimization mechanism may determine that the work assignment is not handled by enough qualified agents. In response, the training optimization mechanism may pull agents from their inbound work pool, at least temporarily, and push training to them that is pertinent to the high-priority work type.

As used herein a "contact" can be a real-time contact like a phone call, voice over IP or VoIP call, chat, and/or video call. Alternatively, or in addition, the contact can be a non-real-time contact like an email, fax, voicemail, telephone transcript, and/or video message. The term "call" may be used interchangeably with the term "contact" as used herein.

In some embodiments, the training optimization mechanism may detect a large number of contacts in a particular work type. Upon detecting the high volume of contacts, the training optimization mechanism may review resource deficiencies and attempt to push training to agents to handle at least one deficiency by incorporating more qualified agents. This method provides for the ability to train agents as required by monitoring conditions in real-time.

Different training scenarios may be instituted by the training optimization mechanism depending on a number of reasons. In one embodiment, it may be determined that very short training or product updates are needed before an agent can take a contact for a particular work type. This type of training may be considered as spot-training. For example, if agents are selling multiple items it may be necessary to learn about inventory surplus, deficits, and or outages. In another embodiment, more in-depth training may be required before agents can take calls of a specific work type. It is anticipated that training may be started, paused, and completed during an agent's free or ready-time. Moreover, this type of training would allow agents to continue to take contacts and then return easily to training during ready time. This training type may be referred to as ongoing ready-time training. In yet another embodiment, it may be determined to remove agents from being able to take contacts while they complete training This mode of training could be based on the need to sacrifice low value work types service levels in order to expedite training to agents on higher value work types.

In any scenario, the training optimization mechanism may use different rules to determine whether a trainee is "available" to receive a pushed type of training. These rules may include business rules (e.g., skill-based, incentive-based, work type value, etc.) to select one or more agents to receive training Determining availability may also include without limitation evaluating the contact center traffic volume (current, past, or predicted), agent performance, staff levels, expert levels (utilized, under-utilized, or unutilized), agent experience and/or attributes, pedagogical value, agent preferences, and/or combinations thereof.

Although seemingly counter-intuitive, the number of training pushed to agents may increase for a given work type during periods of high contact traffic to address higher value work types to maximize the long-term efficiency of the contact center. Determination of this long-term efficiency may require a balancing between the short-term efficiency of one or more agents with the long-term efficiency of the contact center. Moreover, during periods of low contact volume (or times of predicted low traffic volume) a similar number of training may be pushed to agents if the training optimization mechanism determines a benefit to do so.

In some embodiments, it may be determined that a large number of calls are originating from a source that may require a specific certification in order for an agent to handle the source-originating call. Furthermore, it may be known that the specific certification requires a given range of time to complete (where the range may also include an exact time for completion). In this embodiment, agents may be selected to receive training based on one or more of predicted time of high-volume of calls, past times relating to high-volume calls of a similar and/or identical type, agent availability, time to complete training, long-term efficiency balanced with short term efficiency, service levels, one or more algorithms, and other contact center information. For example, if a high-volume of calls is observed at the contact center where training required for a new agent to handle the call will take X minutes, and the expected call volume is determined to last for Y minutes, then the training optimization mechanism may utilize a mathematical formula to determine whether to train one or more agents. In this example, the formula may take the appearance of pushing training to agents where "X is less than Y." It is anticipated that the algorithm may also take into account the number of agents handling the calls as well current, past, or predicted service levels in order to determine the number of agents who will be pushed training.

In yet another embodiment, one or more agents may represent a number of products in inventory. In the event that the contact volume (or flow) decreases (because one or more items in inventory is sold out), then the training optimization mechanism may observe this decrease and increase pushed training for agents on items that are remaining in inventory. Moreover, the training optimization may increase the training pushed to agents regarding more profitable products.

By dynamically observing the conditions of a contact center and pushing training in real-time to agents to address observed needs, the contact center is able to optimize the balance between long-term and short-term efficiencies while increasing customer service quality. This disclosure reduces the need for organizing training sessions based solely on predicted needs and allows for flexibility in training agents to meet the ever-changing demands of a contact center. Moreover, it helps provide the highest quality service to the customer by focusing an agents training to suit the customer's demands. These and other advantages will be apparent from the disclosure of the invention(s) contained herein.

The above-described embodiments and configurations are neither complete nor exhaustive. As will be appreciated, other embodiments of the invention are possible utilizing, alone or in combination, one or more of the features set forth above or described in detail below.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

BRIEF DESCRIPTION OF THE DRAWINGS

FIG. 4 is a block diagram depicting a first data structure used in accordance with embodiments of the present disclosure; and FIG. 5 is a block diagram depicting a second data structure used in accordance with embodiments of the present disclosure.

DETAILED DESCRIPTION

The invention will be illustrated below in conjunction with an exemplary communication system. Although well suited for use with, e.g., a system having an ACD or other similar contact processing switch, the invention is not limited to use with any particular type of communication system switch or configuration of system elements. Those skilled in the art will recognize that the disclosed techniques may be used in any communication application in which it is desirable to have a team of agents engage in training while servicing a contact.

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Figure 1:
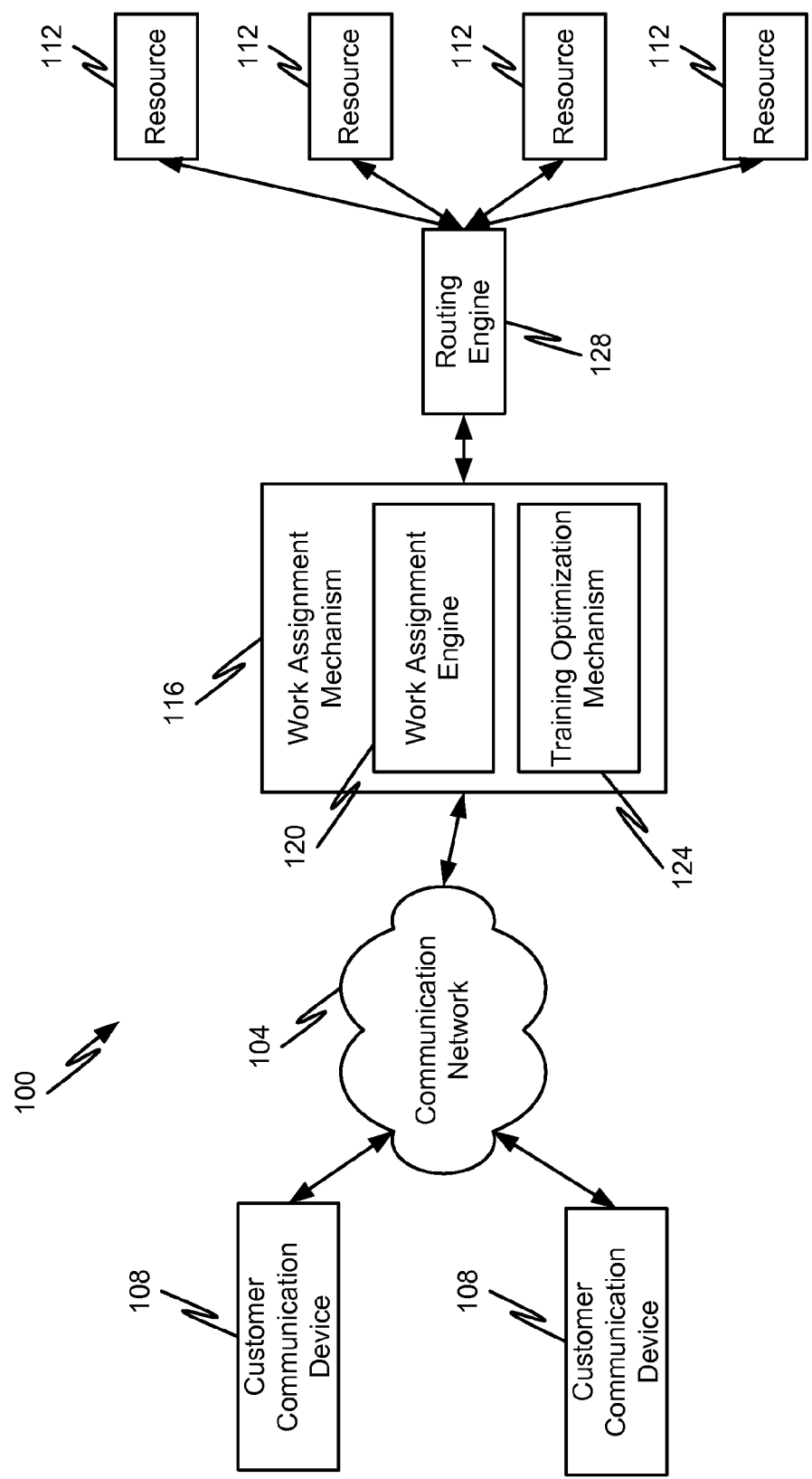
FIG. 1 is a block diagram depicting a communication system in accordance with an embodiment of the present invention.

FIG. 1 shows an illustrative embodiment of a communication system 100 in accordance with at least some embodiments of the present disclosure. The communication system 100 may be a distributed system and, in some embodiments, comprises a communication network 104 connecting one or more communication devices 108 to a work assignment mechanism 116, which may be owned and operated by an enterprise administering a contact center in which a plurality of resources 112 are distributed to handle incoming work items (in the form of contacts) from the customer communication devices 108.

In accordance with at least some embodiments of the present disclosure, the communication network 104 may comprise any type of known communication medium or collection of communication media and may use any type of protocols to transport messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a cellular network, and any other type of packet-switched or circuit-switched network known in the art. In addition, it can be appreciated that the communication network 104 need not be limited to any one network type, and instead may be comprised of a number of different networks and/or network types. As one example, embodiments of the present disclosure may be utilized to increase the efficiency of a grid-based contact center. Examples of a grid-based contact center are more fully described in U.S. patent application Ser. No. 12/469,523 to Steiner, the entire contents of which are hereby incorporated herein by reference. Moreover, the communication network 104 may comprise a number of different communication media such as coaxial cable, copper cable/wire, fiber-optic cable, antennas for transmitting/receiving wireless messages, and combinations thereof.

The communication devices 108 may correspond to customer communication devices. In accordance with at least some embodiments of the present disclosure, a customer may utilize their communication device 108 to initiate a work item, which is generally a request for a processing resource 112. Exemplary work items include, but are not limited to, a contact directed toward and received at a contact center, a web page request directed toward and received at a server farm (e.g., collection of servers), a media request, an application request (e.g., a request for application resources location on a remote application server, such as a SIP application server), and the like. The work item may be in the form of a message or collection of messages transmitted over the communication network 104. For example, the work item may be transmitted as a telephone call, a packet or collection of packets (e.g., IP packets transmitted over an IP network), an email message, an Instant Message, an SMS message, a fax, and combinations thereof. In some embodiments, the communication may not necessarily be directed at the work assignment mechanism 116, but rather may be on some other server in the communication network 104 where it is harvested by the work assignment mechanism 116, which generates a work item for the harvested communication. An example of such a harvested communication includes a social media communication that is harvested by the work assignment mechanism 116 from a social media network or server. Exemplary architectures for harvesting social media communications and generating work items based thereon are described in U.S. patent application Ser. Nos. 12/784,369, 12/706,942, and 12/707,277, filed Mar. 20, 1010, Feb. 17, 2010, and Feb. 17, 2010, respectively, each of which are hereby incorporated herein by reference in their entirety.

The format of the work item may depend upon the capabilities of the communication device 108 and the format of the communication. In particular, work items are logical representations within a contact center of work to be performed in connection with servicing a communication received at the contact center (and more specifically the work assignment mechanism 116). The communication may be received and maintained at the work assignment mechanism 116, a switch or server connected to the work assignment mechanism 116, or the like until a resource 112 is assigned to the work item representing that communication at which point the work assignment mechanism 116 passes the work item assignment decision to a routing engine 128 to connect the communication device 108 which initiated the communication with the assigned resource 112.

Although the routing engine 128 is depicted as being separate from the work assignment mechanism 116, the routing engine 128 may be incorporated into the work assignment mechanism 116 or its functionality may be executed by the work assignment engine 120.

In accordance with at least some embodiments of the present disclosure, the communication devices 108 may comprise any type of known communication equipment or collection of communication equipment. Examples of a suitable communication device 108 include, but are not limited to, a personal computer, laptop, Personal Digital Assistant (PDA), cellular phone, smart phone, telephone, or combinations thereof. In general each communication device 108 may be adapted to support video, audio, text, and/or data communications with other communication devices 108 as well as the processing resources 112. The type of medium used by the communication device 108 to communicate with other communication devices 108 or processing resources 112 may depend upon the communication applications available on the communication device 108.

In accordance with at least some embodiments of the present disclosure, the work item is sent toward a collection of processing resources 112 via the combined efforts of the work assignment mechanism 116 and routing engine 128. The resources 112 can either be completely automated resources (e.g., Interactive Voice Response (IVR) units, processors, servers, or the like), human resources utilizing communication devices (e.g., human agents utilizing a computer, telephone, laptop, etc.), or any other resource known to be used in contact centers.

As discussed above, the work assignment mechanism 116 and resources 112 may be owned and operated by a common entity in a contact center format. In some embodiments, the work assignment mechanism 116 may be administered by multiple enterprises, each of which has their own dedicated resources 112 connected to the work assignment mechanism 116.

In some embodiments, the work assignment mechanism 116 comprises a work assignment engine 120 which enables the work assignment mechanism 116 to make intelligent routing decisions for work items. In some embodiments, the work assignment engine 120 is configured to administer and make work assignment decisions in a queueless contact center, as is described in U.S. patent application Ser. No. 12/882,950, the entire contents of which are hereby incorporated herein by reference.

More specifically, the work assignment engine 120 can determine which of the plurality of processing resources 112 is qualified and/or eligible to receive the work item and further determine which of the plurality of processing resources 112 is best suited to handle the processing needs of the work item. In situations of work item surplus, the work assignment engine 120 can also make the opposite determination (i.e., determine optimal assignment of a work item resource to a resource). In some embodiments, the work assignment engine 120 is configured to achieve true one-to-one matching by utilizing bitmaps/tables and other data structures.

The work assignment engine 120 may reside in the work assignment mechanism 116 or in a number of different servers or processing devices. In some embodiments, cloud-based computing architectures can be employed whereby one or more components of the work assignment mechanism 116 are made available in a cloud or network such that they can be shared resources among a plurality of different users.

In accordance with at least some embodiments of the present disclosure, the contact center 100 employs a training optimization mechanism 124 to monitor one or more of the contact center, agents and/or resources 112, workload, and work types to determine training needs on a real-time basis and push training to agents as deemed appropriate. Monitoring may involve recording and comparing resource 112 usage, contact urgency, contact frequency, agent occupied time, agent free time, percentage of available agents, and other conditions relating to performance of the contact center. In some embodiments, the training optimization mechanism 124 may reside in the work assignment mechanism 116 or in a number of different servers or processing devices. It is anticipated that the training optimization mechanism 124 will operate with the work assignment mechanism in routing and allocating training events. Specific embodiments of the training optimization mechanism 124 are described in further detail in FIGS. 2 and 3. Additionally or alternatively, the training optimization mechanism 124 may determine contact center training needs on a predictive basis.

As part of the training optimization process, the training optimization mechanism 124 may review conditions associated with a contact center to determine whether the contact center is operating in an "under-trained" state. These conditions may include but are in no way limited to information relating to the contact center workload, the nature of one or more work types handled at the contact center, the technical skill and/or efficiency of one or more agents, and the efficiency of the contact center. In some embodiments, these conditions may be associated with at least one identifier that triggers the training opportunity mechanism 124 to monitor and respond to the contact center state. During this determination, the training opportunity mechanism 124 may refer to instructions stored in memory to determine whether condition criteria are met that will trigger a training optimization event.

In some embodiments, the training optimization mechanism 124 may determine that the monitored conditions indicate a need for training. The type of training may be determined by referring to at least one of skills associated with one or more agents, work types identified by the contact center, contact information (e.g., origination, duration, work type, customer identifier, contact type, etc.), and other data that is available real-time, stored, or predicted that may be used in calculation of training type.

In these instances, the training optimization mechanism 124 may work alone or in combination with the work assignment engine 120 in determining one or more agents to receive training. Generally, the determination of the one or more agents may require referring to at least one agent's attribute and/or skill table. This attribute and/or skill table may be stored in a memory and associated with a given agent and/or group of agents. In some embodiments, an agent's attribute and/or skill set may be automatically updated upon, or after, receiving training. This automatic update may add a skill and/or attribute to an agent's table, indicate a training status (e.g., in-progress, percentage completed, etc.), set an expiration time on skills and/or attributes, set a timer for a given skill and/or attribute, or otherwise identify the training associated with the agent.

In some embodiments, the skill and/or attribute timers may be used to expire and/or list experience for the skill and/or attributes stored in memory. For example, during a high-volume contact scenario, the training optimization mechanism 124 may determine that a special type of "quick-training" is needed to address the increased volume. In this scenario, the training optimization mechanism 124 may push a condensed training event to one or more agents to assist in handling contacts. However, the "quick-training" may not fully qualify an agent to list that training on that agent's skill and/or attribute table. Therefore, the expiration timer may be used to set a period of time that the skill is listed. Alternatively and/or additionally, the skill could be marked as a "quick-training" type of attribute with or without the expiration timer. It should be appreciated that the timer may be a special date code associated with a skill set that indicates an expiration time.

In other embodiments, a timer may be used to designate an agent's time since a given skill and/or attribute was acquired through a training event. This timer may be a date code associated with a training event. For instance, an agent ("Agent A") may receive training on a new skill ("Skill X") at some specific time ("Day Y"). Analysis of the agent's skill and/or attribute table by the training optimization mechanism 124 and/or work assignment mechanism 116 may reveal "Z days since Agent A acquired Skill X," where Z is the time that has passed since Day Y. It is anticipated that alternative interpretations (e.g., absolute, relative, etc.) of the time since a skill has been acquired may be implemented other than those described herein.

In accordance with at least some embodiments of the present disclosure, the training optimization mechanism 124 may analyze the type of work being handled by experts, or SMEs. Upon determining that a threshold number of SMEs are handling a demanding work assignment, the training optimization mechanism 124 may pull one or more agents out of the inbound work pool to receive training, thereby increasing the number of SMEs available to handle the demanding work. This removal of one or more agents may be done on a temporary basis (e.g., for a given time period, or until the training has been completed). Furthermore, the determination of which one or more agents to remove from the inbound work pool may be made by analyzing the one or more agents' skill and/or attributes. It is anticipated that if an agent has received previous training and/or is close to certification in a given skill that is shared and used by the SMEs in handling the demanding work assignment, this agent will receive preference in receiving training. Alternatively, the work assignment mechanism 116 may route the agent or agents who are close to certification in a given skill with the work assignment and pull other agents (e.g., those who are less well-trained) from the inbound work pool to receive training.

As can be appreciated, training may be pushed to one or more agents at a determined time. In some embodiments, training may be determined to be pushed to one or more agents during their ready time (i.e., when an agent is not otherwise engaged). Training may be pushed to an agent on a short-term, ongoing, and/or forced basis. In at least one embodiment, the present disclosure is directed to pushing training to one or more agents on a short-term or "spot" basis. This spot-type training may provide product updates, short training events, or skill tests, to one or more agents before they may take another work assignment. An ongoing-type basis may allow an agent to handle contacts while being able to return to training at his or her ready time. It is anticipated that this training would include more in-depth and/or web-based courses. In a forced-type mode of training, an agent may be removed from taking contacts while training is being completed. Determination of these training modes may include the work assignment mechanism 116 and/or the training optimization mechanism 124 balancing high priority work types with low priority work types to achieve the best result. In some cases, low value work type service levels may be sacrificed in order to expedite training to agents on higher value work types.

Figure 2:
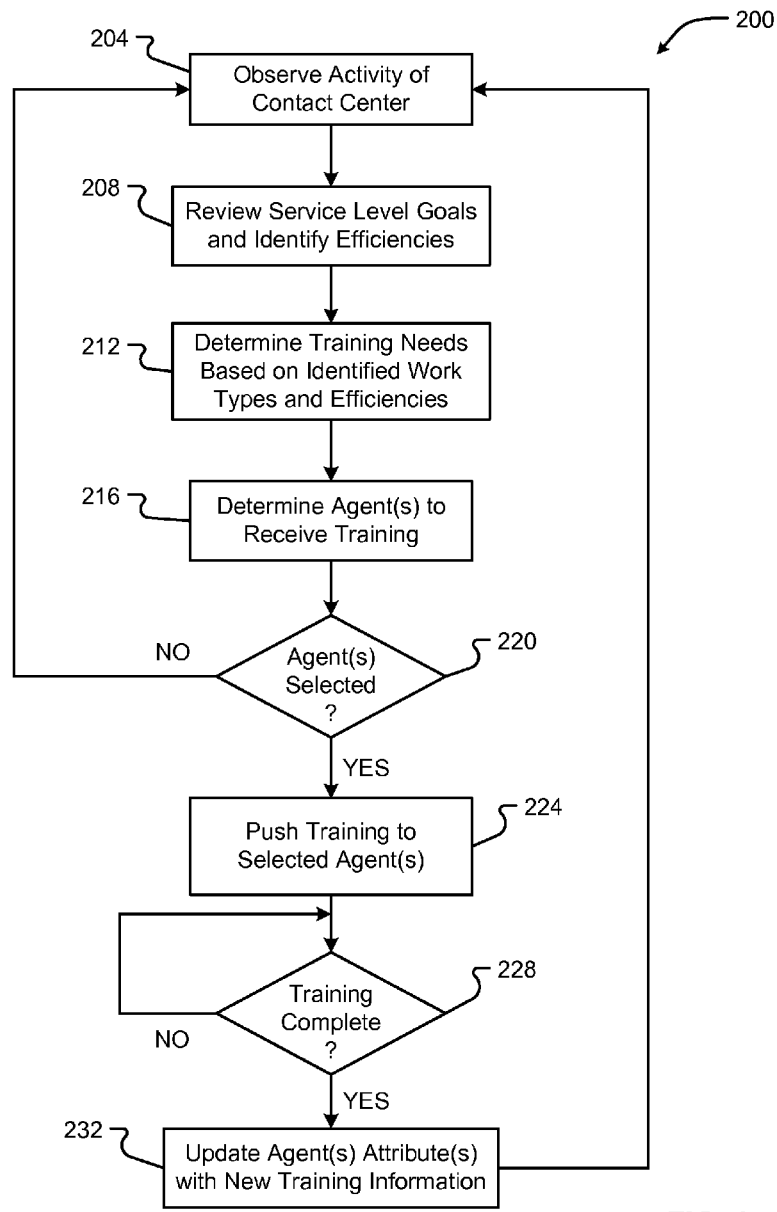
FIG. 2 is a flow chart depicting a first operational embodiment of the contact center in accordance with one embodiment of the present invention.

Referring now to FIG. 2, a flow chart of one embodiment of the training optimization process and interaction with the contact center 100 is shown. The method begins at step 204 where contact center 100 activity is observed. Contact center 100 activities may include the flow of contacts, handled contacts, waiting contacts, contact frequency, work type distribution, agent and/or resource usage, and/or other metrics used in determining whether and to what extent a contact center is operating efficiently. The observation may be performed by the training optimization mechanism 124 monitoring the activities with or without assistance from the work assignment engine 116.

The method continues where the training optimization mechanism 124 reviews service level goals and identifies efficiencies (step 208). By reviewing service goals, the training optimization mechanism 124 may identify the efficiency of the contact center for one or more work types. It is anticipated that the evaluation of efficiencies may employ the use of thresholds and/or deviations from acceptable levels in determining whether training is needed. In the event that an actual service level falls outside of acceptable service level goal (e.g., by exceeding or falling below a predetermined threshold), training may be needed. For instance, if one or more service level goals (e.g., percent occupation, customer wait time, handle time, profit/contact, etc.) are not being met, the training optimization mechanism 124 may identify one or more deficiencies. In contrast, where service goals are being met, the training optimization mechanism 124 may identify one or more efficiencies. Analyzing the conditions surrounding either or both of these efficiencies (where a deficiency is defined as a negative efficiency) may produce data that the training optimization mechanism 124 may use in determining training needs. This data may include a focus on particular work types and associated agent skills and/or attributes.

In some embodiments, identifying the efficiencies associated with one or more work types may allow the training optimization mechanism 124 to analyze one or more agents associated with efficient service goals, deficient service goals, and/or both to determine training needs (step 212). In particular, it may be determined that a high volume of contacts is associated with at least a first work type. When the service level goals are examined surrounding at least a first work type, it may be found that certain agents yield efficient service levels while others yield inefficient and/or deficient service levels. A comparison may be made between the efficient agents and/or the inefficient agents. This comparison may determine skills and/or attributes that are beneficial in addressing the first work type. These determined one or more skills may be stored for further evaluation by the training optimization mechanism 124. In any event, the training pushed to one or more agents will be tailored to match these determined one or more skills. Additionally or alternatively, certain skills and/or attributes may be required for handling a given work type. This requirement is especially important when comparisons may not be effective and/or process-efficient. The associated skills and/or attributes may also be used in tailoring the agent training.

The method continues by determining one or more agents to receive training (step 216) based on training needs. In some embodiments, the training optimization mechanism 124 may analyze the skills and/or attributes of one or more agents, determine their availability and suggest a match. Using skills pertinent to a desired work type, either deduced, anticipated, or otherwise obtained as described above, the training optimization mechanism 124 and or the work assignment mechanism 116 may create a list of one or more agents to receive training.

In the event that no agents are selected, either because performance is within the acceptable thresholds and/or deviations surrounding service level goals, or because no agent qualifies for training, the method returns to step 204.

In contrast, if one or more agents are selected the method continues by pushing training to the selected one or more agents (step 224). The training pushed to one or more agents may be identical or differ depending on a number of factors. For instance, an agent may be close to full certification as an expert in a skill that has also been determined as a skill requiring more trained agents. This agent may receive a condensed training event, while a less-trained agent may receive a full training event on the same skill. In addition, an agent may receive a special-condensed training event that covers a number of topics that are most frequently associated with common contact interrogatives. In some embodiments, this agent may be qualified to handle contacts on a temporary basis with regard to the skill. It is anticipated that an agent may extend this period with further training.

The training optimization mechanism 124 may employ a check to determine whether training is complete for one or more agents (step 228). This check may include a number of methods to determine a completed training state including a poll and answer routine, an alert module, and/or timer and the like.

Once training has been successfully completed for at least one agent, the method continues by updating the trained agent's attribute and/or skill set with the new training information (step 232). This information may include but is not limited to data related to the training received such as the type of training, time of training, limits on training, expiration of training, and the like. Successful completion of a training event may require completion within a certain period of time, correctly answering questions, interacting with the training event, and/or other characteristics In some embodiments, where at least one agent has not successfully completed training, the training optimization mechanism 124 may cause that at least one agent's attribute set to reflect this lack of training completion. Additionally, the attribute set associated with the one or more agents who have not completed training may also be encoded with a percentage of completion, the type of training, the time of training, limits on training, and expiration times as have been previously described for completed training events. Once the attribute sets are sufficiently updated, the method returns to observing contact center 100 activity (step 204).

Figure 3:
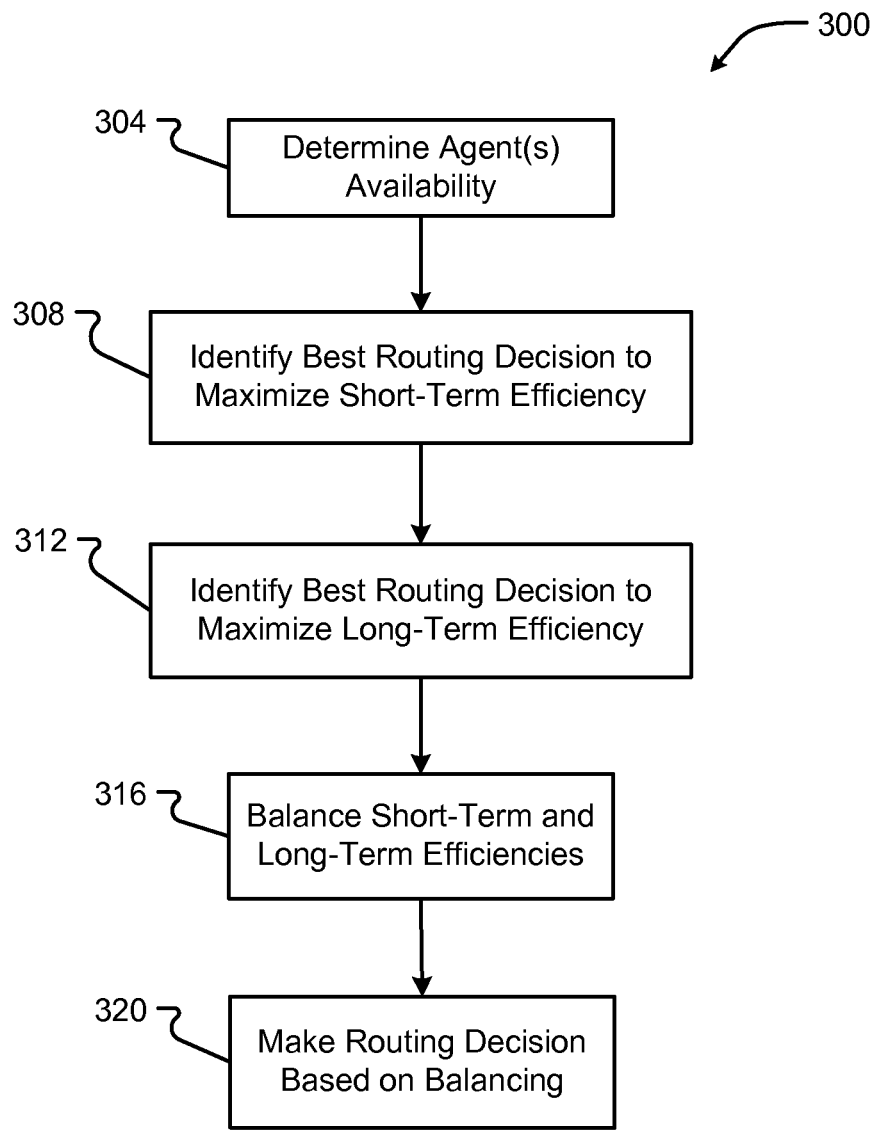
FIG. 3 is a flow chart depicting a second operational embodiment of the contact center in accordance with one more embodiment of the present invention.

Referring to FIG. 3 a method of determining training needs and routing work items based on such determinations will be discussed in accordance with embodiments of the present disclosure. The method begins at step 304, where the training optimization mechanism 124 and the work assignment mechanism 116 determine the availability of one or more agents. Determining availability may include, but is in no way limited to, assessing whether an agent is, engaged with a contact, in a ready-time mode, in training, present at the contact center, or accessing a connected resource of the contact center. An agent's availability is not necessarily the same as an agent's ability to immediately handle a contact and/or receive training. In fact, availability as used herein may refer to the ability of an agent to be engaged, as directed by the work assignment mechanism 116, within a specific time period. Therefore, in one example, all of the agents in a contact center may be engaged in work assignments but may be considered "available" because they may be engaged after completing work on their current assignments.

When one or more agents have been determined as "available," the method continues by identifying the best routing decision to maximize the short-term efficiency of the one or more available agents (step 308). In evaluating at least one agent's short-term efficiency, the work assignment mechanism 116 and/or the training optimization mechanism 124 may determine the number of contacts in queue, predicted contact volume, and a work type associated with each of the contacts. In addition, the training optimization mechanism 124 may analyze the one or more available agents for skills and/or attributes. The training optimization mechanism 124 may then produce a routing decision to allocate the one or more available agents to best suit the agents' efficiency. For example, one agent may be identified as available and capable of being engaged in another work assignment after completing a first work assignment. In this example, if the contact center 100 is receiving a high volume of calls, then it may be most efficient for the agent to be placed on another work assignment immediately after handling the first work assignment. However, if the agent is not fully qualified (i.e., trained) to handle the work type associated with the assignment, then the efficiency of the contact center may be decreased.

Step 312 describes the training optimization mechanism 124 identifying the best routing decision to maximize the long-term efficiency of the contact center 100. This long-term efficiency routing decision may be contrary to the short-term routing decision determined in step 308. In evaluating the long-term efficiency of the contact center 100, the work assignment mechanism 116 and/or the training optimization mechanism 124 may determine a number of contacts in queue, predicted contact volume, actual contact volume, and a work type associated with each of the contacts. In addition, the training optimization mechanism 124 may further analyze existing or predicted intensive work assignments. In this analysis, the service level efficiencies, goals, and handling agent attributes may be reviewed. The skills and/or attributes associated with agents attaining efficient service levels may be reviewed to identify a particular skill pertinent to service level efficiency. The training optimization mechanism 124 may then produce a routing decision to allocate the one or more available agents to best suit the contact center efficiency. This routing may include pushing training to one or more determined agents. For example, a contact center 100 may be inundated with a high volume of contacts in a specific work type. In this example it may be determined that a group of available agents could assist with addressing the high volume of contacts by receiving training before being matched with contacts. Therefore, the training optimization mechanism 124 may create a routing decision based on this determined long-term efficiency.

While step 308 and 312 of the method may produce a short-term and a long-term efficiency routing decision respectively, it is the balancing operation described at step 316 that determines which routing decision will be implemented. In balancing the identified routing decisions, the training optimization mechanism 124 may refer to similar, if not identical, characteristics to those used in evaluating the short- and long-term efficiencies. One particular balancing characteristic may relate to the "value" of a work type. As can be appreciated, not all contacts are created equally in a contact center 100. Moreover, some contacts and/or work types are of a lower value than others. It is anticipated that these lower value work types may be sacrificed to expedite training in higher value work types.

In some embodiments, work flow may play a role in balancing efficiencies. For instance, if a large number of calls are observed as originating from a given region where certification is required in a particular skill, then training more agents in this particular skill may assist in the long-term efficiency of handling the calls. The time to complete training in a particular skill or skills may also factor into the balancing of efficiencies. For example, if it is predicted that a high volume of calls is expected over the next few hours at a contact center and training takes one hour per agent (whether the training may be performed concurrently or sequentially), it may be best to push training to a determined number of agents in lieu of them handling a call in an untrained or under-trained condition.

In a contrasting example, a contact center may be experiencing a dearth of contacts at a given moment and as such may determine that the optimal balance of efficiency may be to push training to its agents. It is anticipated that the training type may include spot-training, ready-time training, and/or forced training for one or more agents. One or more algorithms, equations, and/or systems of equations, may be used by the training optimization mechanism 124 in determining the optimal balance between long-term and short-term efficiencies.

The method continues by the training optimization mechanism 124 and/or the work assignment mechanism 116 making the routing decision based on the determined optimal balance of efficiencies (step 320). This decision may require the training optimization mechanism 124 to direct the work assignment mechanism 116 to push training types to one or more agents via the routing engine 128. Although training may be pushed to the one or more agents determined, the contact center and/or a management resource may decide to reallocate at least one agent in and/or out of training. For instance, if the determination was made to train five agents and then integrate them with a large number of contacts, but the number of contacts increases dramatically at the contact center while the agents are in training, the system may be overridden to reallocate agents to handle the unpredicted call volume. This reallocation may be made manually and/or automatically by a management resource.

FIG. 4 depicts one example of a data structure 400, which may be generated and used by the various components of the contact center. In particular, the training optimization mechanism 124, work assignment mechanism 116 and/or other components may use the data structure 400 or multiple similar data structures to facilitate the training optimization process as described herein. In some embodiments, a single data structure 400 may comprise the data necessary for the training optimization mechanism 124 to analyze conditions for training optimization, review efficiencies, balance efficiencies, review agent availability, review and/or update agent attributes and/or skills, and match selected agents with pushed training for determined types. Alternatively, the contact center may employ the use of different data structures that may be similar but do not necessarily have to have the exact same data fields as shown in FIG. 4.

The example data structure 400 depicted comprises a plurality of data fields that contribute, at least in part, to the process of optimizing training Examples of such data fields include, without limitation, a work type field 404, a resource and agent rules field 408, a service goals field 412, an actual service levels field 416, an efficiency threshold field 420, an efficiency balancing rules field 424, a training attribute update field 428, and a management allocation rules field 432.

The work type field 404 may comprise data which describes a work type associated with current and/or possible contacts. In some embodiments, the work type field 404 may include an identifier related to a work type and/or specific attributes associated with a work type. Moreover, this work type field may further include a work type value. As described herein, a work type value may be used in the balancing process to determine and select training events. In other embodiments, the work type may also determine a ranked position and the like.

The resource and agent rules field 408, on the other hand, may comprise data relating to interpreting information related to one or more resources and any associated agents. The data in this field may be used to compile and store one or more resources and/or agents' instantaneous and/or predicted availability. Moreover, the field may provide rules used to direct the interaction between the training optimization mechanism 124 and the work assignment mechanism 116, work assignment engine 120, and/or the contact center's 100 associated components in routing training to one or more agents. In addition, the data field may define rules used in the evaluation attributes associated with one or more agents.

The service goals field 412 may comprise data related to one or more service goals of the contact center 100 and/or agent. These goals may include ideal rates of service associated with one or more agents. For instance, it may be a service goal that each agent handle a certain number of calls in a specific time period. Moreover, one or more service goals may exist that defines a goal relating to time spent per call. Alternatively or additionally, the goals in this field may relate to the service of the contact center 100. For example, this field may contain ranges and/or exact ratios of overall "busy time to ready-time" that must be met in order for the contact center 100 to be considered efficient. These goals may be used by the training optimization mechanism 124 in balancing efficiencies and selecting training to push to one or more agents.

The actual service levels field 416 may comprise data relating to the actual service levels of the contact center 100 and/or at least one agent. Data in this field may be stored with at least one identifier to associate the actual levels with one or more individual agents. Other characteristics may be included in this at least one identifier representing work type, time, efficiency, frequency, and/or other data related to an agent's service level. If the field includes data associated with the actual service levels of the contact center 100, such data may include numbers of contacts handled, received, transferred, in queue, and/or dropped. Moreover, data relating to contact center 100 service levels may include average, summed, and/or mathematically altered interpretations of one or more agents' service levels.

The efficiency threshold field 420 may comprise data relating to how closely the actual service levels are in meeting the service goals set forth in field 412. As can be appreciated, the thresholds described in this field may be directed to one or more agents, the contact center, and/or combinations thereof. Moreover, it is anticipated that the efficiency threshold field 420 may be used in evaluating the efficiency of the training received by at least one agent. The efficiency threshold field 420 may include automated routines, algorithms, and/or other rules to determine efficiency based on actual service levels versus service goals.

The efficiency balancing rules field 424 may comprise automated routines, algorithms, and/or other rules to determine one or more of: 1) whether the efficiency threshold is met between the actual and goal service levels, 2) the values of efficiency based on work type, 3) ranking efficiencies for selection, 4) selecting a long-term efficiency, short-term efficiency, and/or no efficiency where necessary, and 5) providing a direction to the work assignment mechanism 116 for routing training as determined. Instructions may be contained in the efficiency balancing rules field 424 to direct one or more automated routines, or the like, to refer to other data fields of the data structure 400 and/or other data structures.

The training attribute update field 428 may comprise rules to evaluate training received by one or more agents, analyze training status, and update one or more agents' attributes to reflect the training status. This field may update a training status by manipulating data associated with at least one agent's attribute set. Manipulating data may include adding a skill and/or attribute, modifying a training completion percentage, and/or modifying the presentation of a skill to reflect a level of training completion.

The management allocation rules field 432 may comprise automated routines, algorithms, and/or other rules that may be used to reallocate the assignment of one or more agents. It is anticipated that this field may reallocate an agent at any point before, during, and/or after one or more agents have been allocated to training or otherwise. Alternatively or additionally, the management allocation rules field 432 may comprise a single bit and/or bit string to indicate to the work assignment mechanism 116 that one or more training decisions will be overruled by a management resource.

FIG. 5 depicts one example of a data structure 500, which may be generated and used by the various components of the contact center. Similar to the data structure manner described above, the training optimization mechanism 124, work assignment mechanism 116 and/or other components may use the data structure 500 or multiple similar data structures to facilitate the training optimization process as described herein. In some embodiments, a single data structure 500 may comprise the data necessary for the training optimization mechanism 124 to analyze and/or modify agent characteristics for use in training optimization, efficiency, availability, and match selected agents with pushed training. The contact center may employ the use of different data structures that may be similar but do not necessarily have to have the exact same data fields as shown in FIG. 5.

The example data structure 500 depicted comprises a plurality of data fields that contribute, at least in part, to the process of optimizing training Examples of such data fields include, without limitation, an agent identifier 504, a skills and/or attributes field 508, an availability field 512, a work type preferences field 516, and an agent performance field 520.

The agent identifier field 504 may comprise data used to identify at least one agent from another agent. This data may include a character, group of characters, bit, group of bits, and/or the like.

The skills and/or attributes field 508 may comprise data related to an agent's skill set. The data in this field may include information relating to training completed, received, and/or in progress. It is anticipated that the data included in this field may be updated to reflect changes to training status and/or skills. Updates may include listing a training status, which may further include a percentage complete indication. For example, if an agent receives training on a new skill and completes that training, the skill and/or attribute field 508 may be modified to present this new skill in the agent's set of skills. One or more skills and/or attributes may be included in this field. Timers, date codes, and/or expirations associated with one or more skills may also be stored in this data field.

The availability field 512, on the other hand, may comprise data relating to one or more resources and any associated agents. The data in this field may store a resource and/or agent's instantaneous, historical, and/or predicted availability. Availability may be determined by presence detection techniques and/or configurable status indicators. Furthermore, availability may be used to determine the availability of an agent to be allocated or otherwise engaged with a work assignment.

It is anticipated that the data structure may further include a work type preferences field 516 to allow an agent to request, avoid, or deny specific work types. For instance, a work type may include intensive speaking operations and/or talking interactions with a customer, but the agent may be mute and/or incapable of speaking. Therefore, in this example, the agent may deny the work type that involves this speaking/talking operation. Furthermore, this work type preferences field 516 may be used to more efficiently place agents into training. For example, in the event that training is required in a given work type, the training optimization mechanism 124 may review the work type preferences field 516 of one or more agents to determine an optimal training recipient. As can be appreciated an agent willing to receive training is different from one who has requested training in a given work type. Therefore, this data field may allow for further optimization in selecting agents and analyzing efficiencies.

The agent performance field 520 may comprise data that records an agent's performance in handling contacts, meeting service level goals, availability, and/or any other instantaneous, historical, and/or predictive performance metric. Similar to the work type preference field 516 described above, the training optimization mechanism 124 may refer to this field to better push training and balance efficiencies. It is further anticipated that information contained in this data field may be updated.

The present disclosure, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present disclosure, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
    causing a computing system to perform operations comprising:
    determining that a contact center is failing to meet at least one service level objective within a predetermined threshold with respect to contacts of a first type;
    receiving, in the contact center, a contact of a second type;
    determining that a first contact center resource is eligible to process the contact of the second type but not the contacts of the first type;
    routing to the first contact center resource a training opportunity in lieu of routing the contact of the second type, thereby causing the contact of the second type to wait for a different contact center resource to become available;
    balancing a short-term loss in efficiency associated with not routing the contact of the second type to the first contact center resource with a long-term gain in efficiency associated with routing the training opportunity to the first contact center resource; and
    based on the balancing of the short-term loss with the long-term gain, determining that an overall efficiency of the contact center is maximized by routing the training opportunity to the first contact center resource.

2. The method of claim 1, wherein the training opportunity takes longer to complete than an expected time for the first contact center resource to process the contact of the second type.

3. The method of claim 2, further comprising:
    while the first contact center resource is processing the training opportunity and before the first contact center resource has completed the training opportunity, determining that the contact center is failing to meet at least one service level objective within a predetermined threshold with respect to contacts of the second type;
    in response to determining that the contact center is failing to meet the at least one service level objective within the predetermined threshold with respect to the contacts of the second type, interrupting the first contact center resource while it is processing the training opportunity; and
    during the interruption of the first contact center resource, routing at least one contact of the second type to the first contact center resource.

4. The method of claim 3, whereby the operations further comprise:
    after interrupting the first contact center resource, determining that the contact center is meeting the at least one service level objective with respect to contacts of the second type; and
    allowing the first contact center resource to continue processing the training opportunity in lieu of routing additional contacts of the second type to the first contact center resource.

5. The method of claim 2, whereby the operations further comprise:
    while the first contact center resource is processing the training opportunity and before the first contact center resource has completed the training opportunity, determining that the contact center is failing to meet at least one service level objective within a predetermined threshold with respect to contacts of the second type;

determining a first value corresponding to an amount by which the contact center is failing to meet the at least one service level objective with respect to contacts of the first type;

determining a second value corresponding to an amount by which the contact center is failing to meet the at least one service level objective with respect to contacts of the second type;

determining that the first value exceeds the second value; and in response to determining that the first value exceeds the second value, allowing the first contact center resource to continue processing the training opportunity.

6. The method of claim 1, wherein the contacts of the first type correspond to a first skill requirement and the contact of the second type corresponds to a second skill requirement that is different than the first skill requirement.

7. The method of claim 1, wherein the at least one service level objective comprises one or more of the following: First Call Resolution, dollar amount/contact, dollar amount/minimum, Profit/contact, Profit/minimum, Average Handle Time, Abandon Rate, agent preference, closure rate, quality score, commit to pay rate, revenue/target, and customer satisfaction.

8. A non-transitory computer-readable medium comprising processor-executable instructions that, when executed by a processor, perform the method of claim 1.

9. The method of claim 1, wherein the first contact center resource is eligible to process the contact of the second type when the first contact center resource is available and wherein the first contact center resource is undertrained to service the contact of the second type.

10. A contact center, comprising:
a work assignment mechanism configured to receive contacts of a first type and contacts of a second type, the work assignment mechanism including a work assignment engine that is configured to assign the contacts received at the work assignment mechanism to one or more resources in the contact center;
a routing engine configured to distribute the contacts among the one or more resources based on assignment instructions received from the work assignment mechanism;
a training optimization mechanism configured to determine that the contact center is failing to meet at least one service level objective within a predetermined threshold with respect to contacts of the first type, determine that a first contact center resource is eligible to process contacts of the second type but not the contacts of the first type, and instruct the work assignment engine to assign the first contact center resource a training opportunity in lieu of assigning waiting contacts of the second type, thereby causing the contacts of the second type to continue to wait for a different contact center resource to become available; and
wherein the training optimization mechanism is further configured to balance a short-term loss in efficiency associated with not routing the contact of the second type to the first contact center resource with a long-term gain in efficiency associated with routing the training opportunity to the first contact center resource and, based on the balancing of the short-term loss with the long-term gain, determine that an overall efficiency of the contact center is maximized by routing the training opportunity to the first contact center resource.

11. The contact center of claim 10, wherein the training opportunity takes longer to complete than an expected time for the first contact center resource to process the contact of the second type.

12. The contact center of claim 11, wherein the training optimization mechanism is further configured to determine, while the first contact center resource is processing the training opportunity and before the first contact center resource has completed the training opportunity, that the contact center is failing to meet at least one service level objective within a predetermined threshold with respect to contacts of the second type and in response to determining that the contact center is failing to meet the at least one service level objective within the predetermined threshold with respect to the contacts of the second type, interrupt the first contact center resource while it is processing the training opportunity thereby allowing the work assignment engine to route at least one contact of the second type to the first contact center resource during the interruption of the training opportunity.

13. The contact center of claim 12, wherein the training optimization mechanism is further configured to determine, after interrupting the first contact center resource, that the contact center is meeting the at least one service level objective with respect to contacts of the second type and then inhibit the work assignment engine from assigning additional contacts to the first contact center resource, thereby allowing the first contact center resource to continue processing the training opportunity.

14. The contact center of claim 11, wherein the training optimization mechanism is further configured to determine, while the first contact center resource is processing the training opportunity and before the first contact center resource has completed the training opportunity, that the contact center is failing to meet at least one service level objective within a predetermined threshold with respect to contacts of the second type and then further determine a first value corresponding to an amount by which the contact center is failing to meet the at least one service level objective with respect to contacts of the first type, determine a second value corresponding to an amount by which the contact center is failing to meet the at least one service level objective with respect to contacts of the second type, determine that the first value exceeds the second value, and in response to determining that the first value exceeds the second value, allow the first contact center resource to continue processing the training opportunity.

15. The contact center of claim 10, wherein the contacts of the first type correspond to a first skill requirement and the contact of the second type corresponds to a second skill requirement that is different than the first skill requirement.

16. The contact center of claim 10, wherein the at least one service level objective comprises one or more of the following: First Call Resolution, dollar amount/contact, dollar amount/minimum, Profit/contact, Profit/minimum, Average Handle Time, Abandon Rate, agent preference, closure rate, quality score, commit to pay rate, revenue/target, and customer satisfaction.

17. The contact center of claim 10, wherein the first contact center resource is eligible to process the contact of the second type when the first contact center resource is available and wherein the first contact center resource is undertrained to service the contact of the second type.

18. A server operating in a contact center, the server comprising:
a work assignment engine configured to receive contacts of a first type and contacts of a second type, and then assign the received contacts to one or more resources in the contact center; and a training optimization mechanism configured to determine that the contact center is failing to meet at least one service level objective within a predetermined threshold with respect to contacts of the first type, determine that a first contact center resource is eligible to process contacts of the second type but not the contacts of the first type, and instruct the work assignment engine to assign to the first contact center resource a training opportunity in lieu of assigning waiting contacts of the second type, thereby causing the contacts of the second type to continue to wait for a different contact center resource to become available; and wherein the training optimization mechanism is further configured to balance a short-term loss in efficiency associated with not routing the contact of the second type to the first contact center resource with a long-term gain in efficiency associated with routing the training opportunity to the first contact center resource and, based on the balancing of the short-term loss with the long-term gain, determine that an overall efficiency of the contact center is maximized by routing the training opportunity to the first contact center resource.

19. The server of claim 18, wherein the at least one service level objective comprises one or more of the following: First Call Resolution, dollar amount/contact, dollar amount/minimum, Profit/contact, Profit/minimum, Average Handle Time, Abandon Rate, agent preference, closure rate, quality score, commit to pay rate, revenue/target, and customer satisfaction.

20. The server of claim 18, wherein the first contact center resource is eligible to process the contact of the second type when the first contact center resource is available and wherein the first contact center resource is undertrained to service the contact of the second type.

* * * * *